United States Patent [19]

Lansing

[11] Patent Number: 4,900,344
[45] Date of Patent: Feb. 13, 1990

[54] PORTABLE ROOM AIR FILTER

[75] Inventor: James P. Lansing, St. Cloud, Minn.

[73] Assignee: JVJ Enterprises, Inc., St. Cloud, Minn.

[21] Appl. No.: 323,446

[22] Filed: Mar. 14, 1989

Related U.S. Application Data

[60] Continuation-in-part of Ser. No. 237,512, Aug. 26, 1988, which is a division of Ser. No. 119,785, Nov. 10, 1987.

[51] Int. Cl.⁴ ............................................. B01D 46/00
[52] U.S. Cl. ........................................ 55/322; 55/323; 55/482; 55/467; 55/481
[58] Field of Search ............... 55/316, 322, 467, 323, 55/470–473, 482, 486, 481

[56] References Cited

U.S. PATENT DOCUMENTS

| 999,973 | 8/1911 | Farmer | 55/322 |
|---|---|---|---|
| 2,808,124 | 10/1957 | Attwood | 55/473 |
| 3,802,168 | 4/1974 | Deckas | 55/473 |
| 4,244,712 | 1/1981 | Tongret | 55/470 |
| 4,311,291 | 1/1982 | Knab | 55/387 |
| 4,737,173 | 4/1988 | Kudirka et al. | 55/316 |
| 4,749,390 | 6/1988 | Burnett et al. | 55/316 |
| 4,810,269 | 3/1989 | Stackhouse et al. | 55/471 |

FOREIGN PATENT DOCUMENTS

| 1448873 | 7/1966 | France | 55/472 |
|---|---|---|---|
| 11352 | 4/1975 | Japan | 55/486 |

Primary Examiner—Bernard Nozick
Attorney, Agent, or Firm—Fitch, Even, Tabin & Flannery

[57] ABSTRACT

A portable room air filter includes a cabinet with an open bottom. A blower mounted atop a filter chamber is located at the bottom of the cabinet. The filter chamber receives one or more air filter modules. The air filter modules may include a filter media layer having opposed major surfaces and baffle members for directing air flow generally parallel to the major surfaces.

6 Claims, 2 Drawing Sheets

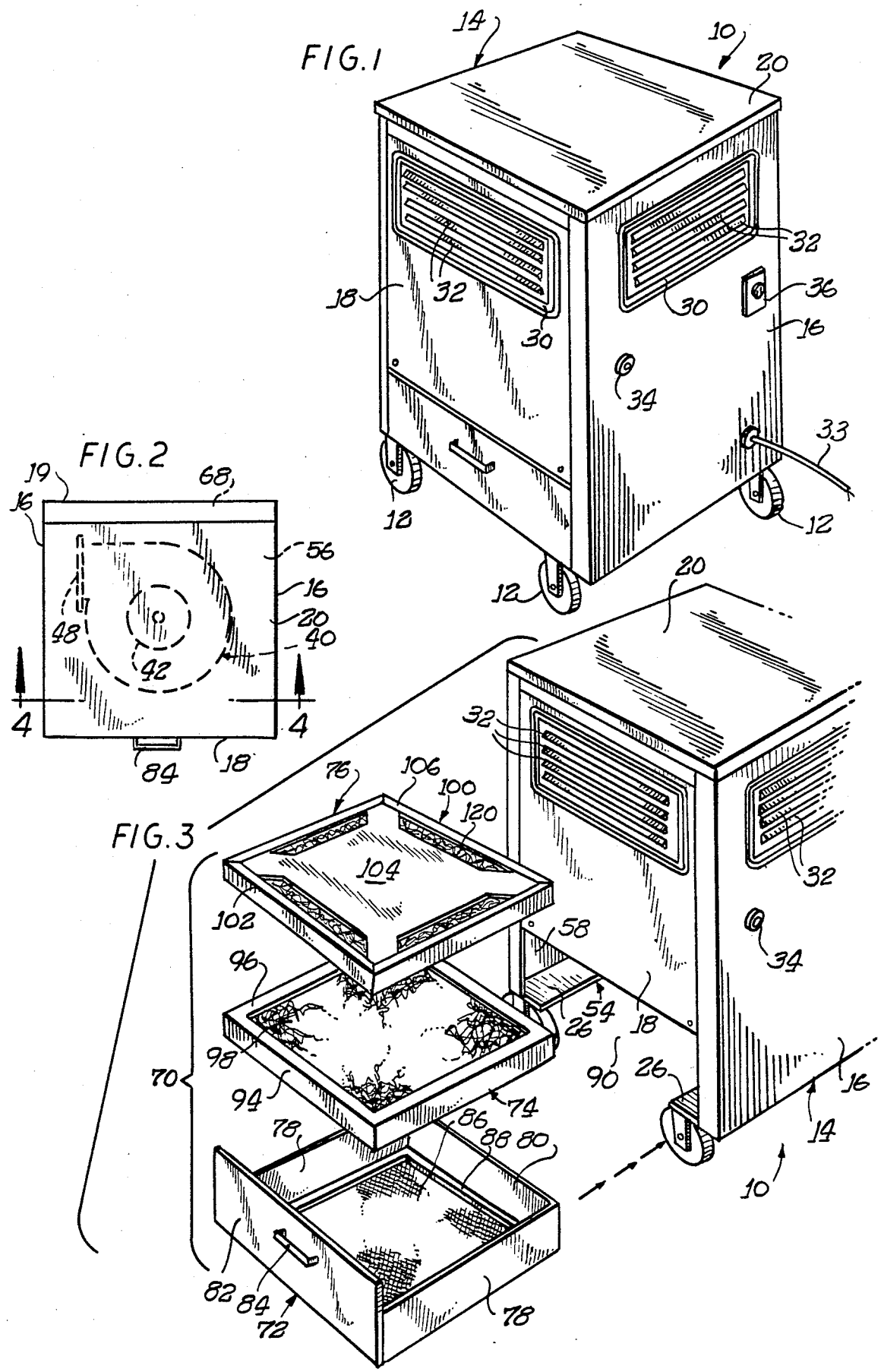

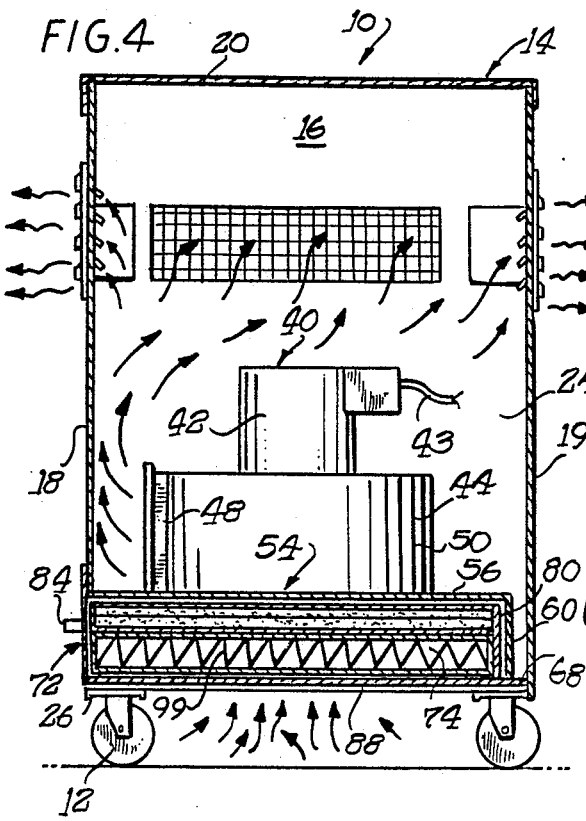
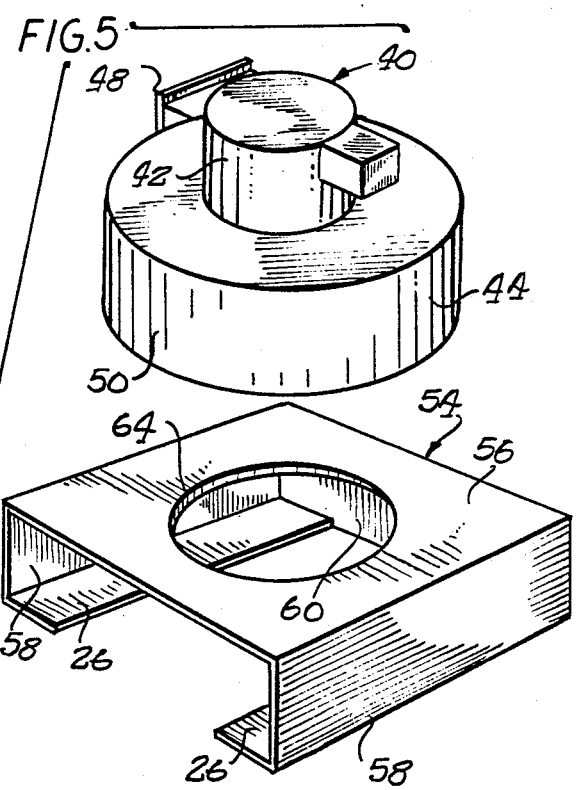
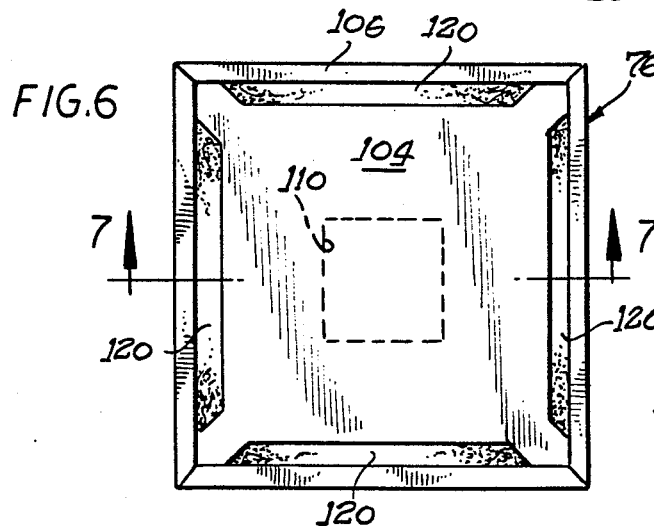
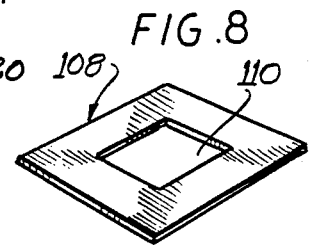
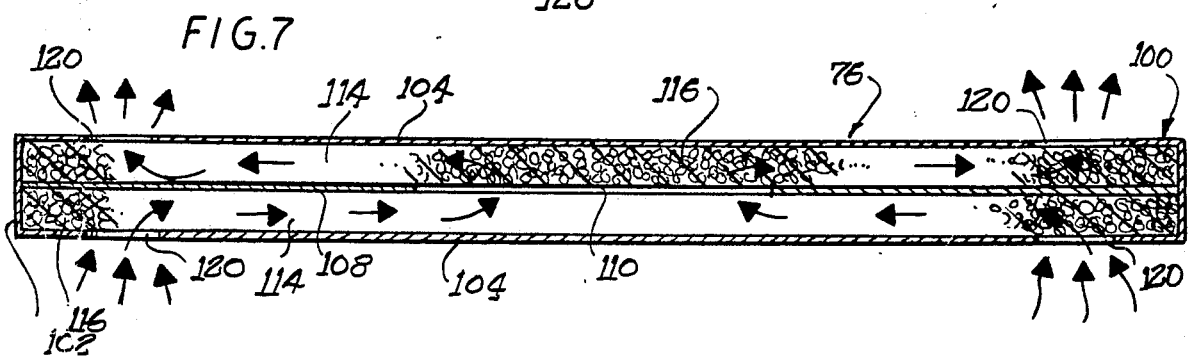

PORTABLE ROOM AIR FILTER

RELATED APPLICATIONS

This is a continuation in part of copending U.S. Pat. application Ser. No. 237,512 filed Aug. 26, 1988, which is a division of copending U.S. Pat. application Ser. No. 119,785 filed Nov. 10, 1987.

BACKGROUND OF THE INVENTION

1. Field of the Invention

The present invention pertains to power-driven air filtering units and in particular to such air filtering units which are portable, being easily movable from room to room.

2. Description of the Related Art

A wide variety of air filters are available for use today. The filters typically include a blower arrangement for circulating air, and a filter stage or perhaps several filter stages disposed in the air path so as to filter or otherwise purify air flowing therethrough. The air filters differ widely in their volume capacity, their efficiency of filtration, and their ease of portability.

Several different types of filtering stages are available for use in present day air filters. The air filter stage may have, for example, an electrostatic precipitator type of element which charges dust or other airborne contaminants and attracts the airborne contaminants to an electrically charged grid. In general, electrostatic air filter stages are expensive to fabricate and install, and they require relatively costly maintenance. In addition, there is a substantial electrical power requirement in addition to that needed for maintaining an air flow through the filter stage.

As a second general type of air filtering, one or more layers of porous media are disposed in an air flow path for "mechanically" filtering or trapping airborne particles contained in the air flow. In general, if a greater efficiency of filtering is desired, additional stages or filtering layers are added. This, however, multiplies the cost of the initial filtering stage and frequently results in a significant pressure drop across the filter, thus requiring a higher fan capacity for maintaining a desired air flow.

Users of air filters are frequently concerned about the amount of air treated by a filter stage in a given time period. Some air filters are available as a relatively small scale device, such as an air filter for an ash tray. Such filters cannot be scaled up to a larger size so as to accommodate a user who desires several changes of air volume in a room, for each hour of operation of the air filter. This concept of room air filtering is frequently expressed as a number of "room changes" of air per hour. For purposes of comparison, building codes frequently require that public restaurants and the like public buildings have at least one or two air changes per hour, meaning that a volume of air equal to that required to fill a room is completely removed and replaced by fresh air at least once or twice each hour that the room is open to the public. The present invention is particularly concerned with air filters capable of filtering the air in an entire room on the order of once every hour and perhaps several times per hour.

In a practical air filter system, much more is needed than simply providing sufficient fan capacity to "turn over" the air filling a room at the desired rate. For example, the efficiency of the filter media, over the life thereof must be considered. As air is flowed through a porous filter media, airborne particles and the like are trapped in the filter media, thus reducing the porosity thereof and increasing the resistance of the air flow through the filter stage.

Other types of air filtering media may be provided which react with dissolved chemicals suspended in the air. Such filters frequently operate by adsorbing the chemical contaminants by collecting those contaminants in condensed form on the media surface. The adsorbed contaminants have the potential for changing the surface properties of the air filter media and in particular, have the potential of changing the resistance to air flow through the media. While an air filter stage could be "oversized" so as to provide a minimal acceptable air conductance at the end of its useful life, the cost of the air filter media in the stage rises significantly as does the size of that filter stage.

In addition, special considerations must be given to particular types of air filter media. For example, activated charcoal is a popular type of air filter media in use today and is frequently utilized as a bed of charcoal particles through which an air flow is conducted. U.S. Pat. No. 3,191,362 discloses an electrostatic air purifier, having a cabinet within which a blower is mounted to draw a horizontal air flow through the cabinet, inducing the air flow over energized electrodes and through a bed of activated charcoal filter particles disposed in the cabinet.

At times, design concerns center around the threshold question of operating efficiency of the activated charcoal bed for a given passage of an air flow therethrough. If this threshold question cannot be adequately resolved, there is little point in considering reduced efficiency of the air filter unit over time.

Presently, there exists a need for a high volume portable room air filter having at least a minimum filtering efficiency for types of contaminants frequently encountered in everyday situations. Of particular interest is the availability of an effective portable air filter for use in beauty parlors, in smoke-filled offices, and in sick rooms of patients suffering from asthma or other respiratory diseases. However, in order to be practical in use, the air filter should be sufficiently small in size and readily portable so that it can be moved from room to room and so that it can also be easily moved within a room without significantly changing the operation thereof, or adversely affecting the comfort of occupants in the room, located proximate the air filter. Several arrangements of portable room air filters have been proposed, yet the above-stated need for further improvements still exists. Examples of conventional air filter apparatus include that disclosed in U.S. Pat. No. 1,196,169 in which a cabinet is provided for enclosing a container for crushed ice and salt. A blower mounted atop the cabinet or a fan mounted within the cabinet induces an air flow over the surface of the container, thus cooling and dehydrating the air flow through the unit.

U.S. Pat. No. 3,757,495 discloses a portable air purifier having an elongated generally upright cabinet with a series of blowers located at the bottom thereof, adjacent a pair of opposed inlets. Adjacent each inlet are two layers of different filtering materials. The first filter material removes particles from the air flow that are greater than ten microns in size. The second air filter stage, made of activated carbon, aluminum silicate or the like, further filters the air to remove particles less than ten microns in size. In addition, if the second filter stage comprises activated carbon, certain contaminants may be treated while passing through the filter. Both filter stages are generally planar in configuration, with air flow being induced normal to their major surfaces. Air flow exiting the filters is flowed through a labyrinthine path of a compartment containing ultraviolet light lamps to provide further air purification. Purified air is then discharged through the top of the cabinet.

In U.S. Pat. No. 3,812,370, a portable air filter is provided also having a generally upright, elongated configuration. A cage-mounted blower is installed at the bottom of the cabinet and induces air to flow in an upward direction through a series of vertically oriented folded fiber filter constructions. A fine fiber, small particle filter material is supported by overlying layers of a coarse woven supporting net or screening. Upwardly directed air flows across the interior surfaces of the folded filter media and, being confined against further upward flow, is redirected to pass through the filter media, exiting therefrom in a generally horizontal direction.

SUMMARY OF THE INVENTION

It is an object of the present invention to provide an air filter apparatus which is portable, so as to be readily movable from one location to another without considerable effort. Another object according to the present invention is to provide an air filter apparatus having activated charcoal filter media and providing a relatively long residence time of an air flow travelling through the charcoal filter stage.

A further object according to the present invention is to provide an air filter system having a relatively high volume, yet which does not create annoying drafts, even for people located immediately adjacent the air filter.

As those who are familiar with residential home heating systems are aware, drafty rooms can be quite uncomfortable, even if maintained at an otherwise comfortable temperature. While it is desirable to provide an air filter capable of treating an entire room full of air one or more times per hour, the benefits of that filtering will not be enjoyed as much if a user present in the room is made uncomfortable by being subjected to drafts caused by the air circulation pattern in the room. Air drafts which disturb papers or other articles that may be placed about a room are also undesirable as is the "wind noise" which often accompanies a large volume air flow.

These and other objects according to the present invention, which will become apparent from studying the appended description and drawings are provided in a portable room air filter comprising:

a cabinet having opposed bottom and top ends and at least one sidewall therebetween, forming an enclosure defining an opening at the bottom end for air flow communication with the enclosed interior of the cabinet;

aperture means in the cabinet sidewall remote from the opening for air flow communication with the enclosed interior of the cabinet;

an air filter chamber enclosing the opening at the bottom end of the cabinet and defining a central passageway for air flow therethrough into the cabinet interior;

blower means between the air filter chamber and the cabinet interior having an intake at the air filter chamber passageway and a discharge directed toward the cabinet interior, below said aperture means; and an air filter in the air filter chamber.

The air filter preferably includes at least one filter media layer having an interior bounded by opposed major surfaces facing blower means and the cabinet opening respectively.

The air filter preferably further comprises baffle plates on either side of the filter media layer, having openings to direct air inducted by said blower means through the interior of said filter media in directions generally parallel to the major surfaces thereof.

BRIEF DESCRIPTION OF THE DRAWINGS

In the drawings wherein like elements are referenced alike,

FIG. 1 is a perspective view of a portable room air filter apparatus illustrating aspects of the present invention;

FIG. 2 is a top plan view of the air filter apparatus of FIG. 1;

FIG. 3 is a fragmentary perspective view with air filter components thereof shown exploded;

FIG. 4 is a cross-sectional elevational view taken along the line 4—4 of FIG. 2;

FIG. 5 is an exploded perspective view of the blower and filter chamber components of the air filter of the preceding figures;

FIG. 6 is a top plan view of an air filter assembly;

FIG. 7 is a cross-sectional view taken along the line 7—7 of FIG. 6; and

FIG. 8 is a perspective view of an internal baffle plate of the filter assembly of FIGS. 6 and 7.

DETAILED DESCRIPTION OF THE PREFERRED EMBODIMENT

Referring now to the drawings, and in particular to FIG. 1, a portable room air filter apparatus is generally indicated at 10. As will be seen, the apparatus 10 includes air blower and air filter systems for processing the air in a room or the like enclosure. The apparatus 10 has been constructed as a relatively compact commercial prototype having outside dimensions easily fitting within a cube of two foot dimension, and is relatively light weight so as to be easily transported from one location to another. In addition, the apparatus 10 has a plurality of roller wheels 12 so that it can be easily rolled about within a room or perhaps between rooms of a dwelling or business office.

Apparatus 10 includes a cabinet 14 preferably made of sheet metal or the like rigid material. Cabinet 14 includes sidewalls 16, a front wall 18, a rear wall 19 and a top wall 20 cooperating to provide, as will be seen herein, an air tight enclosure surrounding an internal cavity 24 (see FIG. 4). Referring to FIGS. 3 and 4, cabinet 14 further includes bottom partial floor panels 26 which, as will be seen, cooperate with an air filter assembly to provide a complete enclosure for the cabinet interior 24.

The blower assembly is positioned at the bottom end of cabinet 14 with the remaining upper portion of the cabinet comprising a temporary holding chamber for air exhausted from the air filter and air blower assemblies. A plurality of vents 30 are installed in the cabinet sidewalls and front wall, adjacent the upper end thereof. The vents 30 include louvers 32 which may be selectively opened or closed to allow air flow or to block air flow therethrough.

Referring again to FIG. 1, the blower of the preferred embodiment is preferably electrically operated, receiving electrical power through a power supply cord 33. The blower is preferably operable at a variety of speeds, and a knob 34 for controlling those speeds is mounted on a sidewall 16 of the cabinet. If desired, a convenience receptacle 36 may be provided for energizing other appliances, such as those positioned about the air filter apparatus 10, which are unrelated to its operation. The power for convenience receptacle 36 is received from the power supply cord 33.

Referring now to FIG. 4, a blower assembly is generally indicated at 40. The blower assembly includes an electrical motor 42 having a downwardly extending rotatively driven shaft extending into and mechanically coupled to blower 44. Blower 44 has a squirrel cage fan (not visible in the drawings) which is rotated about a vertical axis, having an intake port at the bottom end thereof, and an outlet port 48. Motor 42 has an electrical conductor 43 coupled to the power supply cord 33 through the speed control 34. The blower 44 includes an outer housing 50 surrounding the motor driven fan.

Referring now to FIG. 5, the preferred air filter apparatus includes an internal wall assembly generally indicated at 54. The wall assembly is preferably constructed from an integral blank of sheet metal material. Wall assembly 54 includes an upper mounting wall 56 joined to downwardly depending sidewalls 58 and a downwardly depending rear wall 60. The partial floor panels 26 referred to above are preferably formed to extend from the sidewalls 58 so as to provide an economical manufacture of the cabinet. As seen in FIG. 5, the top wall 56 of the internal wall assembly 54 includes a circular aperture 64 aligned in registry with the inlet port to the blower 44. As can also be seen in the perspective view of FIG. 5, the rear wall 60 extends to the partial floor panels 26 and, in the preferred embodiment, is joined thereto to form an airtight seal, in a manner similar to the juncture of the sidewall 58 with the rear wall 60.

Referring to FIGS. 3 and 4, the internal wall assembly 54 is mounted within cabinet 14, at the lower most portion thereof, so as to divide the cabinet interior 24. The sidewalls 58 of the internal wall assembly are joined in airtight overlapping relationship with the bottom portions of cabinet exterior sidewalls 16. As illustrated in FIG. 4, the internal wall assembly top panel 56 extends from front wall 18 and preferably is joined thereto with an airtight seal, but stops short of the opposed exterior sidewall 16 of the cabinet.

Accordingly, the rear wall 60 of the internal wall assembly 54 is relied upon to provide an airtight enclosure for the bottom, rear portion of cabinet 14. A short extension 68 extends between the rear wall 60 of the internal wall assembly and the exterior rear wall 16 of cabinet 14 to complete the enclosure of the cabinet interior 24. The air exiting blower assembly 40 pressurizes the cabinet interior and, in the preferred embodiment, the internal wall assembly, the extension 68 and the cabinet exterior walls cooperate to provide a pressure-tight enclosure surrounding the blower output port. Thus, all air entering the cabinet interior 24 is constrained to flow through the aperture 64 in the top panel 56 of the internal wall assembly 54.

Referring now to FIG. 3, a tray assembly is generally indicated at 70. The tray assembly 70 includes a tray-like container 72, a first filter or pre-filter 74, and a filter assembly 76. The air filter assembly 76 is preferably of the type disclosed in copending U.S. parent patent application Ser. No. 119,785 filed Nov. 10, 1987, the disclosure of which is herein incorporated by reference.

The tray-like carrier 72 includes sidewalls 78 and an end wall 80. Carrier 72 also includes a front wall 82 with a handle 84 attached thereto. The bottom of tray-like carrier 72 is essentially open, and in the preferred embodiment is covered with a screen 86 for safety purposes. The safety screen 86 is optional and can be removed, if desired. Surrounding the safety screen 86 is a border or lip 88 of relatively narrow dimensions for engaging the bottom outer periphery of air filter modules installed in the carrier, such as the air filter 74 and/or the filter assembly 76 of the preferred embodiment.

Referring again to FIG. 4, the tray carrier 72 is telescopically receivable in the opening 90 formed below the front panel 18 and is slidable along the partial floor panels 26, which act as slide runners therefor. When fully inserted in the bottom portion of cabinet 14, the carrier tray 72 forms an airtight assembly therewith, except for the open bottom end of the carrier, that end preferably enclosed by screen 86. That is, with further reference to FIG. 4, the front wall 86 of tray-like carrier abuts against either the front face or the bottom edge of the cabinet front wall 18, and the carrier sidewalls 78. The bottom lip 88 engages the floor panels 26 as does the back wall 80 which spans those floor panels. When the tray-like carrier is fully seated within the lower portion of cabinet 14, the only air permitted to enter the cabinet interior 24 must flow through the bottom opening of the tray carrier, through optional screen 86. Thus, the tray-like carrier provides a convenient receptacle for a variety of air filter modules which may easily be inserted and withdrawn therefrom for servicing when the tray carrier is opened or even removed from cabinet 14.

Referring again to FIG. 3, the air filter modules of the preferred embodiment preferably include a pre-filter 74 having a generally rectangular plinth-like configuration, with sidewalls 94 and partial top and bottom walls 96 surrounding the outer periphery of the filter. The filter media within filter 74 may comprise a spun fiber material 98 (see FIG. 3) or a pleated paper filter 99 commonly known in the art as a "Z"- line filter, as illustrated in FIG. 4. In the preferred embodiment, filter 74 provides a pre-filtering for particulate, pollen, and any airborne grease or the like particles so as to complement and extend the life of the activated carbon filter media within the filter assembly 76. As illustrated, the air filter 74, when provided, preferably comprises a conventional design having major top and bottom surfaces which are opened as much as possible to allow a straight-through air flow through the filter with as little impedance thereto as is possible.

The air filter assembly 76 includes an outer housing generally indicated at 100 and is preferably formed of sheet metal, a stiff paper or cardboard material or the like. The housing 100 is of a generally rectangular plinth-like construction with sidewalls 102 and baffle plates 104 at the top and bottom of the air filter assembly. The top and bottom walls of housing 100 preferably include a strip-like border 106.

The filter assembly 76 further includes an internal solid baffle plate 108, illustrated in FIG. 8 having a central aperture 110 for air flow therethrough. The housing and the central baffle plate, as well as the top and bottom baffle plates 104 are preferably made of an imperforate material so as to block air flow therethrough. As illustrated in FIG. 7, the baffle plates 104, 108 are arranged generally parallel to one another, and are generally of the same size, being aligned in registry so as to fit within the sidewalls 102 of the housing 100.

The baffle plates 104, 108 form a pair of adjacent cavities 114 in which activated charcoal filter media is placed. The charcoal media preferably comprises a mat or sheet-like structure and reference numeral 116 is used to refer to the activated charcoal sheets disposed within the filter assembly 76. As indicated in FIG. 7, the housing 100 forms an airtight containment of the activated charcoal sheets 116 so that air flowing through the filter assembly is controlled and directed by the imperforate surfaces of the baffle plates and housing components.

Referring now to FIGS. 3 and 6, the outer baffle plates 104, according to one aspect of the present invention, are provided with a series of peripheral slots 120. Due to the imperforate nature of the center of baffle plate 104, the only air flow past the baffle plate 104 is confined to the peripheral slots 120. Although not visible in the figures, the bottom baffle plate 104 is substantially identical to the visible, top baffle plate 104. Referring briefly to FIG. 8, as described above, the central baffle plate 108 is imperforate, except for the central aperture 110, and in the preferred embodiment is joined with an airtight seal to the housing sidewalls 102.

Referring to FIG. 7, and with particular attention to the arrows shown therein indicating the direction of air flow, operation of the filter assembly 76 will now be described. Air is induced to flow through the air filter assembly 76, in directions generally perpendicular to the external baffle plate 104. However, the air flow within the air filter assembly 76 is quite different, and departs from conventional filter designs, and in particular, air flow entering the bottom baffle plate 104, at the peripheral slots 120 thereof is constrained from flowing in axial directions by the outer periphery of imperforate baffle plate 108, so that, upon passing through the peripheral slots 120, incoming air is entrained within the lower charcoal filter sheet 116.

With air flow being blocked by the imperforate baffle plate 108, incoming air flow seeks the path of least resistance and the air flow is turned so as to enter and pass through the central aperture 110. As those familiar with cyclonic air filter apparatus are aware, the heavier particles fall out of an air flow whenever the air flow is caused to make a change of direction. Thus, there is a localized trapping of heavier air filter products in the air filter media of charcoal sheets 116, adjacent the peripheral slots 120.

According to another aspect of the present invention, air flow passing between the peripheral slots 120 of the outer baffle plates 104 and the central aperture 110 of the central baffle plate 108 is constrained to flow in a direction generally parallel to the planar baffle plates, so as to pass through the thickness of the charcoal filter sheets 116, rather than in a direction generally perpendicular thereto, as in conventional filter arrangements. More specifically, air flow through the charcoal sheets 116 is confined between the opposed major surfaces of the sheets, which are enclosed by the imperforate baffle plates 104, 110 so as to prevent the air flow from bypassing the filter media. In the illustrated embodiment, therefore, the lower sheet 116 of activated charcoal filter media has air flow entering the four peripheral edges thereof, converging toward the central portion of the sheet which overlies the central aperture 110 of the central baffle plate 108.

Further air flow through the filter assembly 76 is blocked by the central portion of the imperforate top baffle plate 104. Again, air flow is forced to undergo a change in direction, flowing in a generally opposite direction toward the outer periphery of the air filter assembly. As before, the air flow through the upper filter sheet 116 is constrained to pass in a direction generally parallel to the major surfaces of that sheet, and is constrained to pass within those major surfaces due to a substantially continuous contact between the filter sheet surfaces and the baffle plates 104, 110. The air flow, seeking the path of least resistance, is directed toward the peripheral slots 120 of the upper baffle plate 104 and with a final turn in direction, exits the baffle plate, toward the blower intake.

As can be seen from the above, air flow exiting the filter assembly 76 is localized at the outer periphery thereof. Therefore, referring briefly to FIG. 4, a gap is provided between the upper baffle plate 104 and the top wall 56 of the interior wall assembly 54 since the blower 44 of the preferred embodiment has a dimension somewhat smaller than that of the major surface dimensions of the filter assembly 76.

As will now become apparent to those skilled in the art the air filter assembly 76 of the present invention achieves numerous advantages, including an increased residence time of air flow within the activated charcoal filter media, accompanied by a cyclonic precipitation of heavier air flow particles adjacent the slots and internal apertures of the baffle plates. The efficiency of the activated charcoal filter media is greatly improved, and a reduced volume of filter media can be employed to achieve a given filtered throughput through the air filter apparatus.

According to one aspect of the present invention, the filter and blower assembly is mounted adjacent the lower end of cabinet 14. As can be seen in FIG. 4, the cabinet interior 24 is of a considerably larger size than in that required to hold the air filter and blower assemblies. The cabinet interior above the blower output port 48 comprises a temporary holding chamber for pressurized, filtered air exiting the blower. According to another aspect of the present invention, the blower output port 48 is disposed so as to direct air flow in a direction generally toward one of the sidewalls 16 or perhaps the front or back wall of cabinet 14.

These features cooperate to provide a heretofore unrealized low noise, low velocity, high volume air flow in a portable room air filter. Mechanical noises attributed to blower operation are muffled within cabinet 14, and the reduced air flow velocity greatly reduces wind noise. Accordingly, the room air filter according to the present invention is particularly useful in living quarters where users prefer a quiet, peaceful setting or in a sickroom, even at locations immediately adjacent a patient who might be sensitive to noise or drafts and who is exposed to the filtered output of apparatus 10 for prolonged periods of time.

By way of illustration and not limitation, a commercial prototype of a room air filter apparatus according to the present invention had top wall dimensions of approximately 16"×16" and had an overall vertical height of approximately 21", with the top wall spaced 23" from a floor surface. The prototype air filter of this relatively small, compact size has been observed to provide a filtered throughput of up to 350 cfm at a filtering efficiency, of known common airborne contaminants associated with residential dwellings and business offices, of up to 99%. According to one aspect of the present invention, this remarkable performance is achieved with the aforementioned cabinet and internal wall assembly structures which eliminate "blow-by" of air bypassing the air filter modules, or "short-circuiting" the inlet and outlet ports of the blower assembly.

It will thus be seen that the objects herein and before set forth may readily and efficiently be attained and, since certain changes may be made in the above construction and different embodiments of the invention without the departing from the scope thereof, it is intended that all matter contained in the above description or shown in the accompanying drawings shall be interpreted as illustrative and not in a limiting sense.

What is claimed is:

1. A portable room air filter comprising:
   a cabinet having opposed bottom and top ends and at least one sidewall therebetween, forming an enclosure defining
   an opening at the bottom end for air flow communication with the enclosed interior of the cabinet;
   aperture means in the cabinet sidewall remote from the opening for air flow communication with the enclosed interior of the cabinet;
   an air filter chamber enclosing the opening at the bottom end of the cabinet and defining a passageway for air flow therethrough into the cabinet interior;
   blower means between the air filter chamber and the cabinet interior having an intake at the air filter chamber passageway and a discharge below said aperture means directed toward the cabinet interior;
   an air filter in the air filter chamber including at least one filter media layer having opposed major surfaces facing the blower means and the cabinet opening respectively; and
   said air filter further comprising baffle plates on either side of the filter media layer facing the opposed major surfaces thereof, being imperforate except for defining air flow openings through the filter, said baffle plates directing air inducted by said blower means along a path through said filter media, said path having major portions extending in directions generally parallel to the filter media major surfaces.

2. The portable room air filter of claim 1 further comprising plural sheets of air filter media spaced apart by at least one internal plate having spaced inner and outer portions, and defining an air flow opening cooperating with said baffle plates so that air flow is inducted through the media layers along a serpentine path, major portions of which extend generally parallel to the media major surfaces, said baffle plates each having an inner portion, an outer periphery and an outer portion adjacent the outer periphery, said baffle plates further having major surfaces opposing each other and each baffle plate defining an air flow opening for allowing said air flow therepast;
   each media layer having an inner portion and an outer portion adjacent the periphery thereof, with the air flow path extending therebetween;
   sidewall means adjacent the periphery of said filter media layers and cooperating with said baffle plates and said internal plate to confine the air flow between the major surfaces of the filter media layers; and
   the air flow openings of said baffle plates located at one of said inner and said outer portions of said baffle plates and the air flow opening of said internal plate located at the other of said inner and said outer portions of said internal plate, with the filter media layers extending between the openings of said baffle plates and the internal plate, and the internal plate including means for remaining spaced apart from the baffle plates so that said air flow passing between said baffle plates travels through said media layers between the major surfaces thereof, from the inner to the outer portions thereof, while traversing a generally labyrinthian path through said air filter apparatus.

3. The room air filter of claim 1 comprising four sidewalls extending between the bottom and the top ends of the cabinet, with aperture means in at least two of said sidewalls.

4. The portable room air filter of claim 1 further comprising a mounting plate for said blower means forming a portion of said air filter chamber and having a central aperture cooperating with the central passageway of the air filter chamber so as to form an airflow path to the blower intake.

5. The portable room air filter of claim 1 further comprising damper means for selectively closing said aperture means varying amounts to restrict the flow of air therethrough.

6. The portable room air filter of claim 1 wherein said blower means has a discharge directed toward said at least one sidewall, below said aperture means.

* * * * *